July 18, 1972 D. M. BUSH 3,677,822
THERMAL BATTERY HAVING A THERMAL RESERVOIR PELLET
Filed Oct. 23, 1970

INVENTOR.
DONALD M. BUSH
BY

United States Patent Office 3,677,822
Patented July 18, 1972

3,677,822
THERMAL BATTERY HAVING A THERMAL RESERVOIR PELLET
Donald M. Bush, Tijeras, N. Mex., assignor to the United States of America as represented by the United States Atomic Energy Commission
Filed Oct. 23, 1970, Ser. No. 83,582
Int. Cl. H01m 21/00
U.S. Cl. 136—83 T                10 Claims

ABSTRACT OF THE DISCLOSURE

A thermal battery having heat generating means forming a part of stacked cells of the battery and acting to fuze an electrolyte to activate the battery and including a thermal reservoir means near the ends of the cell stack for absorbing heat from the heat generating means during combustion thereof and for thereafter releasing heat to the cell stack. Elements of the battery cell stack are formed as pellets or discs which retain shape during operation and are stacked in an assembly which reduces battery variations during operation.

BACKGROUND OF INVENTION

Thermal batteries may be used as power sources in a number of applications, particularly where reserve batteries having long shelf life are required. Such batteries utilize electrochemical cells which are activated by heat to produce electricity. The cell generally includes suitable anode and cathode elements separated by an electrolyte which is solid and non-conducting at normal or ordinary operating temperatures. When the battery or cells are heated to the melting temperature of the electrolyte, the electrolyte may fuze or melt and become conductive permitting the battery to function and produce electricity by well known electrochemical reactions.

One of the principal limitations of thermal batteries is their relatively short operating life, which may generally be measured in seconds or, at most, a few minutes. Some applications may require an operating life which is substantially longer than these periods of time. Attempts to increase or extend the operating life of thermal batteries have been made by increasing insulation thickness, improving the quality of thermal insulation and increasing heat input to the battery. Space limitations generally preclude substantial increases in the amount of thermal insulation used and present insulating materials are difficult to improve upon, thus limiting the effectiveness of such approaches to extending battery operating life. Heat inputs to the battery can be increased by proper selection of heat generating materials, however, the thermal stability of battery components is a very real limitation to the temperature which the battery can withstand. For example, the electrochemical systems generally used are not stable above 600° C. and may be limited, practically, during operation to temperatures of between about 450° C. and 550° C. Other approaches to extending thermal battery operaing life would be desirable which would not unduly increase the size of the battery or subject the battery elements to excessive temperatures.

Thermal batteries are commonly subject to failure by shorting across or between cells due to movement of conductive materials during battery operation and other electrical failures. Thermal batteries are also subject to variations in output and operating life caused by anomalies inherent in the battery design.

SUMMARY OF INVENTION

It is an object of this invention to provide a thermal battery having a relatively long operating life.

It is a further object of this invention to provide a thermal battery which will reliably provide reproducible electrical outputs.

It is a still further object of this invention to provide a generally improved thermal battery.

Various other objects and advantages will appear from the following description of the invention, and the most novel features will be particularly pointed out hereinafter in connection with the appended claims. It will be understood that various changes in the details, materials and arrangements of the parts which are herein described and illustrated in order to explain the nature of the invention may be made by those skilled in the art.

The invention comprises a thermal battery having heat generating means disposed within stacked electrochemical cells and thermal reservoir means adjacent the cell stack for absorbing heat from the heat generating means during combustion thereof and for thereafter releasing heat to the cell stack to maintain battery operation beyond the time during which the heat generating means is producing sufficient thermal energy to maintain battery operation.

DESCRIPTION OF DRAWING

The invention is illustrated in the accompanying drawing wherein.

DETAILED DESCRIPTION

Figure 1:
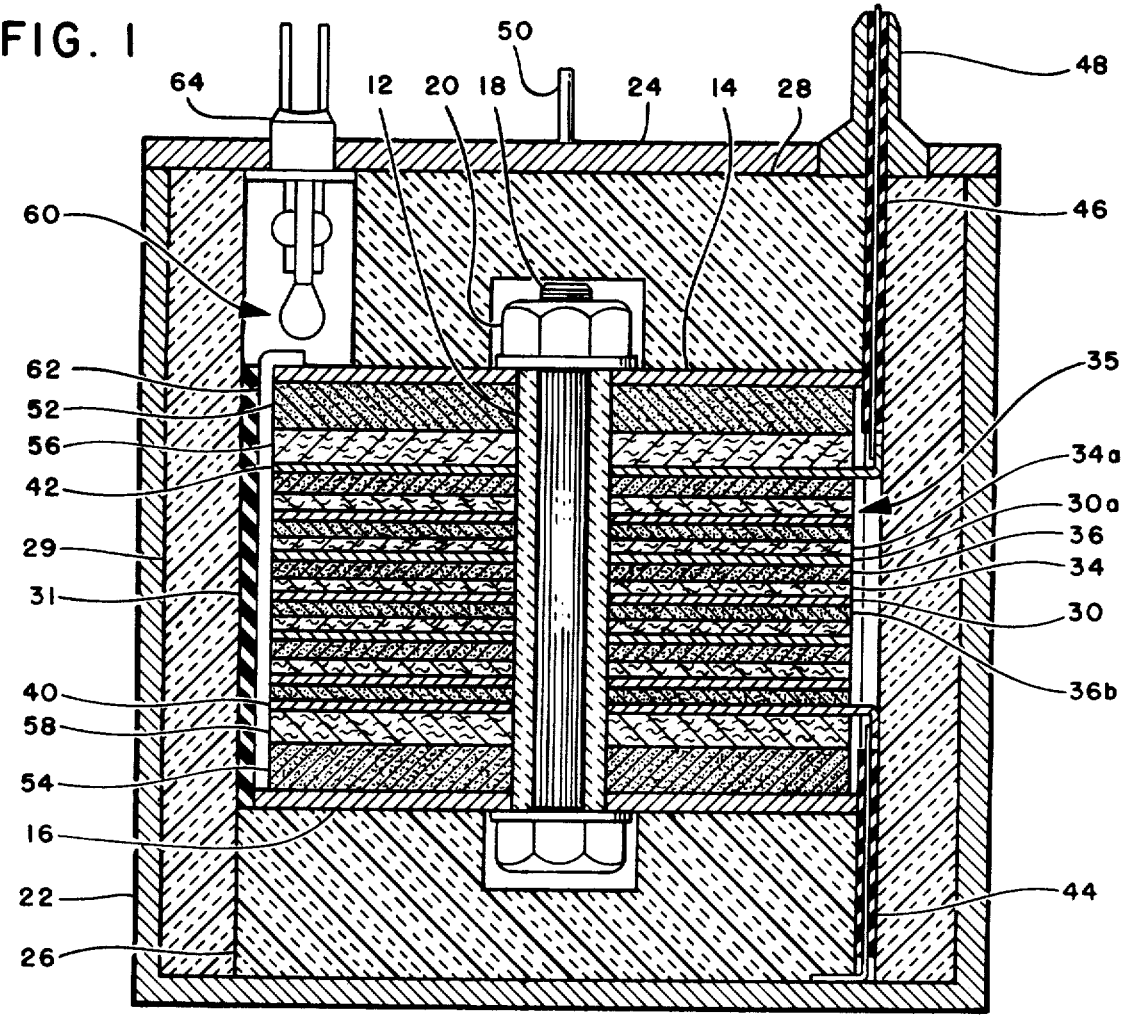
FIG. 1 is a cross-sectional side view of a battery incorporating features of this invention.
Figure 3:
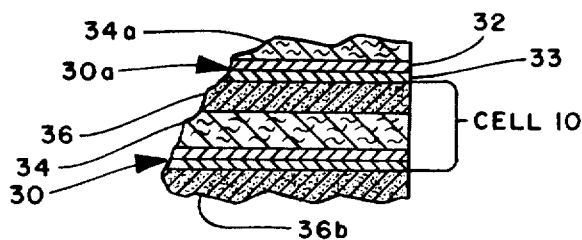
FIG. 3 is an expanded fragmentary view of a portion of one cell of the battery of FIG. 1.
Figure 2:
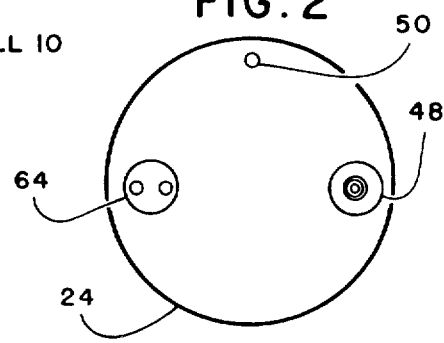
FIG. 2 is a top view of the battery of FIG. 1.

Referring to FIGS. 1, 2 and 3, the thermal battery of this invention may include one or more electrochemical cells 10 having elements stacked in a column about an appropriate insulative mandrel 12 within a suitable casing arrangement. The battery is shown in a generally annular configuration with each of the battery cell elements formed as pellets or discs with a central opening for convenient stacking about mandrel 12. The cell stack may be held in position about mandrel 12 under suitable compressive forces by end plates 14 and 16, bolt 18 and nut 20. The clamped cell stack is then mounted within a suitable container or casing, such as within a cup shaped casing 22 having a cover 24 sealingly mounted thereover, and within appropriately formed insulative end members 26 and 28 and an insulative tubular member 30.

Casing 22 and cover 24 may be a conventional "tin" can and cover or be suitably formed from cold-rolled or deep-drawn steel or from appropriate plastic materials like glass filled epoxies. A "tin" can may provide a much lower thermal mass than the other casing or container materials. Insulative members 26 and 28 and tube 29 may be provided with appropriate recesses and cutouts to receive the various battery parts and elements, such as to receive bolt 18 and nut 20 extending from either end of the battery cell stack, as well as other parts to be hereinafter described The insulative members may be made of a semi-rigid insulation which may be machined into the desired shapes and which may withstand any compressive stress or forces applied thereto during assembly and use of the battery. A particularly appropriate insulation may be a mixture of submicroscopic pyrogenic silica, quartz fibers and titanium dioxide opacifier with a composition ratio of about 75–9–16% for the respective materials. Such a formulation may be mixed and pressed to a nominal density of about 20 pounds per cubic foot with a thermal conductivity of about 0.2 B.t.u.-in./hr.-ft.$^{2}$-° F. at a mean temperature of 260° C. Any other appropriate insulation having the desired compressive strength, low thermal conductivity and easy formability may be used. If it is desired, additional layers of thermal and electrical insulation, such as layers made of mica or asbestos, may be wrapped around the battery cell stack as shown by insulation layer 31, so long as a "gap" is maintained between the periphery of the battery cell stack elements and the insulation layers and members. This "gap," shown as gap 35, provides a space about the cell stack in which beads of conductive materials may be formed during operation which retards shorting between cells and provides room for deformation of pellets. The gap may be formed by making each element of the cells smaller in diameter than end plates 14 and 16.

As stated above, each of the elements of the battery cell stack is in the form of an annular ring or disc disposed about insulative mandrel 12. Each of the electrical chemical cells 10 in the cell stack, as shown in greater detail in FIG. 3, is composed of an anode or negative electrode 30 separated from the next cell anode 30a by an electrolyte pellet 34 and a heat generating pellet 36. This basic arrangement is repeated for each of the cells as shown by anode 30a and electrolyte pellet 34a of the next above cell and heat generating pellet 36b of the cell next below. The anode may be formed in bimetallic discs by vacuum depositing or otherwise forming one of the materials used as an anode onto the other to form a unitary bimetallic member. An appropriate negative terminal disc 40 and a positive terminal disc 42 may be positioned at appropriate ends of the electrochemical cell stack to collect the electrical energy produced within the cells. An insulated anode terminal lead 44 may be connected between a tab extending from disc 40 and casing 22 while an insulated cathode terminal lead 46 is connected between a tab extending from disc 42 through feedthrough 48 and the exterior of the battery. Each of the leads 44 and 46 may be passed around the periphery of end plates 14 and 16 or through notches therein, as shown. An appropriate pin 50 may be attached to end cover 24 to complete the connection to the battery cells. Anode terminal lead 44 may be coupled, if desired, through an appropriate feedthrough to the exterior of the battery in the same manner as lead 46.

Additional heat generating pellets 52 and 54 may be positioned or stacked at the ends of the electrochemical cell stack adjacent end plates 14 and 16 with buffer or thermal reservoir pellets 56 and 58 sandwiched between cell stack and heat generating pellets 52 and 54. The heat generating means, that is heat pellets 52 and 54 and the heat generating pellets 36 disposed within cell stack, may be ignited by a suitable electrical match 60 or other ignition device and fuze strip 62. Match 60 may be ignited through an appropriate feed through and lead arrangement 64 by a battery (not shown) or other suitable energy source upon command or occurrence of an event.

The cell stack may be insulated from end plates 14 and 16 and/or from bolt 18 and nut 20 by appropriate insulative washers or members therebetween to further minimize battery failures.

The bimetallic anode discs 30, 30a, etc., may be made of calcium (anode) 32 deposited over an iron substrate or carrier disc 33. The electrolyte pellets 34 may include a mixture of electrolyte, depolarizer, and binder which are mixed in powder form and pressed into homogeneous pellets, generally referred to as DEB pellets. The ratios of the various constituents may be varied depending on the particular application. The depolarizer may be a material such as calcium chromate while the electrolyte may be a lithium chloride-potassium chloride eutectic. The eutectic utilizes about 45 weight percent lithium chloride and has a melting point of about 352° C. The binder may be a submicroscopic pyrogenic silica powder, such as the silica powder used in the insulation formulation described above, having a high purity and high surface area. The silica may be obtained having a purity of about 99% with a surface area of about 200 square meters per gram with a fineness of over $11 \times 10^{15}$ particles per gram.

Because of the characteristics of the silica, it has been found that it must be specially handled together with the electrolyte and depolarizer to obtain physically stable DEB pellets. Appropriate ratios of fuzed electrolyte and calcined binder are mixed in such as a ball mill for a sufficient period of time to obtain a uniform mixture. The mixed powders are then fuzed at a temperature of about 400° C. for about 16 hours (generally a period greater than 4 hours). The fuzed material is then granulated by passing successively through decreasing sieves to a fineness of about a 60 U.S. Standard Sieve. The granulated EB material is mixed with an appropriate ratio of calcined depolarizer powder and mixed in a ballmill until a homogeneous mixture is achieved. The mixed powders are then fuzed in a furnace at 400° C. for a similar period of time as above and the fuzed material then granulated in the same manner as the EB material. This granulated DEB material may be then formed into pellets by pressing under high pressures such as about 24,000 p.s.i. to a density dependent upon the ratio of the constituents. With a DEB ratio of about 35/56/7, the density may be about 1.8 grams per cubic centimeter.

The DEB pellet constituents may be mixed in other sequences than that described above. For example, all the constituents can be mixed simultaneously or in reverse of that above. However, it has been found that this particular sequence produces DEB pellets which provide significantly longer operational lives than do batteries using DEB pellets produced using other process sequences.

The heat generating pellets, that is pellets 54 and 56 and 36, utilized in the battery should be readily ignitable, be electrically conductive after ignition and produce a minimum of gas during ignition. Other characteristics may include easy fabrication into pellets, good physical strength, dimensional stability during ignition, chemical stability, reproducibility, and an appropriate burning rate and thermal output for thermal battery operations. A heat generating material which meets these requirements is iron-potassium perchlorate. This material, with a ratio of iron weight percent of from about 84 to 90% produces a calorific output of about 297 to 181 calories per gram over this range of ratios of materials. At a ratio of 88/12, the calorific output is about 220 calories per gram.

The ignition sensitivity of the heat generating material may be increased by adding such sensitizers as zirconium, copper chromite, potassium dichromate, potassium permanganate, manganese dioxide, lead tetroxide, potassium chlorate, vanadium pentoxide, molybdenum trioxide and the like. These materials do increase the sensitivity of the heat generating material, particularly zirconium and potassium chlorate, however, the calorific output is also increased which may, in some instances, increase the temperature produced by the heat generating pellets above safe operating temperatures for the battery.

The heat generating pellets may be formed by appropriate powder mixing and pelletizing processing.

The heat produced by the various heat pellets may be adjusted by changing the weight of heat powder used in the pellets before pressing the powder into pellet form. As can be seen in the embodiment of the battery illustrated in FIG. 1, heat generating pellets 52 and 54 are thicker than heat generating pellets 36. This arrangement provides a more uniform heat throughout the cell stack insuring uniform generation of electrical power therein. All of the heat generating pellets 36 in this embodiment are shown with uniform thickness. As the height of the cell stack is increased, it may be desirable to vary the thickness of the heat generating pellets within the cell stack to insure uniform generation of heat across the cell stack. Such may be readily achieved with this heat powder and process of formulating the pellets.

In addition to generating thermal energy for activating and operating the electrochemical cell stack, the heat generating pellets 36 within the cell stack also serve as a cathode collector and intercell connector.

The thermal reservoir or buffer pellets 56 and 58 function by absorbing heat from the heat generating pellets during combustion thereof and releasing the absorbed or stored heat to the cell stack or column when the battery begins to cool off after the heat generating pellets have completely burned. These thermal reservoir pellets may be made of salts or salt mixtures having a melting point in the temperature range of interest with relatively high heat of fusion. In operation, the pellets reduce peak temperatures within the battery when the heat of fusion is absorbed and then release thermal energy as heat of fusion as they freeze. During the freezing period, the temperature of the battery may remain relatively constant, depending on the amount of material used in pellets 56 and 58. It has generally been found that salt mixtures or salt eutectics are preferred over the use of a single salt in order to provide a thermal reservoir pellet having suitable melting and freezing points together with a high heat of fusion. The heat of fusion of the eutectics or mixture will be dependent upon the heat of fusion of the respective salts and the ratios of the mixture thereof. The melting points of typical salt eutectics and their composition is shown in the following table:

| Eutectic melting temperature (° C.) | Eutectic system A-B | Composition mole percent A |
|---|---|---|
| 456 | $KCl\text{-}Li_2SO_4$ | 48.5 |
| 470 | $KCl\text{-}MgCl_2$ | 48.5 |
| 474 | $LiBr\text{-}Li_2SO_4$ | 73 |
| 476 | $LiBr\text{-}Li_2CO_3$ | 87.3 |
| 481 | $LiCl\text{-}Li_2SO_4$ | 64 |
| 485 | $CaCl\text{-}LiCl$ | 37 |
| 488 | $K_2CO\text{-}Li_2CO_3$ | 38 |
| 492 | $LiF\text{-}KF$ | |
| 498 | $CaCl_2\text{-}NaCl$ | 54 |
| 499 | $Li_2SO_4\text{-}NaCl$ | 58.7 |
| 500 | $Li_2CO_3\text{-}Na_2CO_3$ | 52 |
| 507 | $LiCl\text{-}Li_2CO_3$ | 61 |
| 507 | $LiBr\text{-}NaBr$ | 83 |
| 521 | $LiBr\text{-}LiCl$ | 59 |

Figure 4:
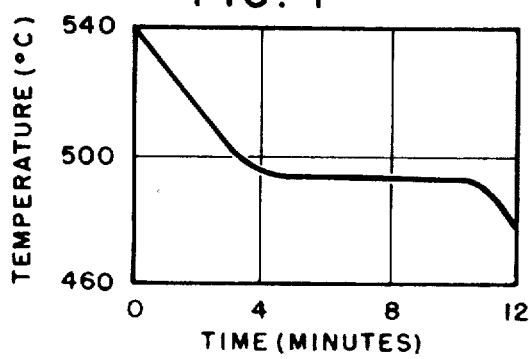
FIG. 4 is a graph of the cooling characteristic of the thermal reservoir means used in the battery of FIG. 1.

The lithium sulfate-sodium chloride eutectic, melting point about 499° C., has a heat of fusion of about 94 calories per gram. The lithium fluoride-potassium fluoride eutectic melts at about 492° C. and releases about 111 calories per gram upon freezing. The cooling curve of the lithium sulfate-sodium chloride eutectic is shown in FIG. 4 where it can be seen that this eutectic may hold the battery temperature constant at about 500° C. for about 7 minutes or more depending upon the eutectic weight. The lithium sulfate-sodium chloride eutectic thus has a melting point near the optimum operating temperature of the battery with a relatively high heat of fusion.

The eutectic which is selected for the thermal reservoir pellet is generally mixed as a powder with a suitable binder, such as the silica binder described above, to insure that the pellet maintains its shape and minimizes movement of molten eutectic during battery operation. During battery activation, the buffer or thermal reservoir pellet absorbs heat reducing peak temperatures, and as the battery cools, this heat is liberated and released back to the battery as the eutectic freezes helping maintain the cell stack temperature.

The function of the heat reservoir or delayed heat release may also be achieved by use of a diffusion-controlled heat generator in which the rate of a very energetic reaction is controlled by a controlled diffusion of one of the reactants to contact with the other reactant in such a manner as to generate heat at about the same rate that heat is lost from the battery. Such may be achieved by using a fuzed salt diffusion barrier between a reactive metal and a molten or soluble salt oxide. The diffusion barrier may consist of a porous glass or metal structure impregnated with fuzed salts, such as lithium chloride-potassium chloride eutectic. The reaction may be achieved between lithium or magnesium and a salt like silver chloride. Another way to achieve this operation is to use reaction materials which form a reaction product layer having a significant diffusional resistance. For example, magnesium may be dispersed in a lithium fluoride-potassium fluoride eutectic as small particles or pellets along with potassium chromate powder. As the magnesium and potassium chromate react, a compact but porous oxide layer may be formed on the surface of the magnesium particles which will impede the further reaction between the reactants.

Other end arrangements and combinations of multiple additional heat generating pellets and/or thermal reservoir pellets may be used, if desired. However, for the cell stack shown, the arrangement and relative sizes thereof illustrated in FIG. 1 was found to produce the most uniform heat throughout the cell stack and battery operation.

The battery may be assembled by first stacking the respective battery cell discs and pellets in the proper sequence between end plates 14 and 16 on mandrel 12. Nut 20 may then be tightened over end plate 14 at some torque level, such as about 2.5 inch pounds to maintain the stack at some desired compression. After placing tubular insulator 29 and end insulative member 26 into casing 22, the stacked battery cells may be placed therein and covered with end insulative member 28 with fuze 62 positioned along the side of the battery cell stack in a notch of end plate 14 in contact with the respective heat generating pellets. The tabs and leads of the battery may be connected to appropriate terminals or feedthroughs thereof and cover 24 placed over the casing and sealed thereto during application of appropriate compressive force to maintain the battery parts in position. If desired, additional insulative wrap 31 may be placed around the battery cell stack leaving a gap between the wrap and the peripheral edges of the respective battery cell stack pellets and discs.

Typically, such a battery may use battery cell stack pellets and discs about 1.375 inches in diameter with end plates about 1.5 inches in diameter. Such a battery may use 5 DEB pellets 0.046 inch thick, 2 thermal reservoir pellets 0.092 inch thick, 2 heat generating pellets 0.124 inch thick, 6 heat generating pellets within the electrochemical cell stack 0.031 inch thick, 5 anode bimetal discs 0.015 inch thick, 2 terminal discs 0.013 inch thick and 2 end plates 0.032 inch thick. If it is desired, insulative discs may be placed between the end plate and the additional heat generating pellets and/or between the nut and bolt head and the end plates. The battery cell stack will be about 1 inch long with a 1½ inch outside diameter. For such a battery cell stack, the casing may be about 2.125 inches outside diameter by 2.25 inches long with a total assembled weight of about 0.3 pound. Such batteries reliably produce an average current of about 330 milliamperes per square inch with an operational life at room temperature in excess of 10 minutes and with an average of about 14 minutes. The operational life was determined by measuring the length of time during which the voltage of the battery remained above 10 volts which is approximately 75% of peak voltage. These batteries produce an average of about 5 watt-hours per pound and about 0.2 watt-hour per cubic inch during operational life.

What is claimed is:

1. A thermal battery comprising a casing; a plurality of electrical battery cells in a column in said casing, each including an anode electrode, a normally solid fusible electrolyte pellet stacked adjacent said anode electrode, and electrically conductive pellet means stacked adjacent said electrolyte pellet for generating heat to fuze said electrolyte pellet; additional pellet means for generating heat disposed at the ends of said battery cell column; a thermal reservoir pellet means having high heat of fusion and a melting point above that of said electrolyte pellets and below the temperature produced by said heat generating pellet means, said thermal reservoir pellet means being disposed between said additional heat generating means and said battery cell column for absorbing heat by melting from heat produced by said heat generating means during combustion thereof and for thereafter releasing heat to said battery cell column by freezing; means for conveying electrical energy from said battery cell column through said casing; and means for igniting said heat generating means.

2. The battery of claim 1 wherein said additional heat generating means weigh more than said battery cell column heat generating means.

3. The battery of claim 2 wherein said battery cell column heat generating means and said additional heat generating means are iron-potassium perchlorate.

4. The battery of claim 1 including thermal insulation positioned about said battery cell column between said battery cell column and said casing, said thermal insulation being a mixture of silica, quartz fibers and titanium oxide powder.

5. The battery of claim 1 wherein said electrodes and pellet means are concentrically mounted about a mandrel under compression between a pair of end plates.

6. The battery of claim 5 wherein said battery cell column electrodes and pellets are of diameters less than the diameters of said end plates.

7. The battery of claim 1 wherein said thermal reservoir pellet means includes a salt mixture eutectic.

8. The battery of claim 7 wherein said eutectic is lithium sulfate-sodium chloride.

9. The battery of claim 1 wherein said electrolyte pellet is a mixture of a depolarizer, a salt eutectic and a binder.

10. The battery of claim 9 wherein said binder is submicroscopic pyrogenic silica.

References Cited

UNITED STATES PATENTS

| | | | |
|---|---|---|---|
| 3,575,714 | 4/1971 | Bennett et al. | 136—83 T |
| 3,558,363 | 1/1971 | Franklin | 136—83 T |
| 3,425,872 | 2/1969 | Levy | 136—83 R |
| 3,447,970 | 6/1969 | Jones | 136—83 R |
| 3,510,357 | 5/1970 | Nielsen | 136—83 R |
| 3,055,960 | 9/1962 | Yalom et al. | 136—83 R |

WINSTON A. DOUGLAS, Primary Examiner

C. F. LeFEVOUR, Assistant Examiner